(12) United States Patent
Buecherl

(10) Patent No.: US 9,751,422 B2
(45) Date of Patent: Sep. 5, 2017

(54) DEVICE FOR SWITCHING A MODE OF A VEHICLE

(71) Applicant: Bayerische Motoren Werke Aktiengesellschaft, Munich (DE)

(72) Inventor: Gunther Buecherl, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 222 days.

(21) Appl. No.: 14/155,867

(22) Filed: Jan. 15, 2014

(65) Prior Publication Data

US 2015/0197160 A1    Jul. 16, 2015

(51) Int. Cl.
*B60L 11/18* (2006.01)
*B60W 20/50* (2016.01)
*B60R 16/023* (2006.01)

(52) U.S. Cl.
CPC ...... *B60L 11/1851* (2013.01); *B60R 16/0231* (2013.01); *B60W 20/50* (2013.01)

(58) Field of Classification Search
CPC ... B60L 11/1851; B60R 16/0231; B60W 20/50; B60G 17/0195; B60G 2206/90; B60G 2600/20; B60G 2800/91; G01R 19/16542; G01R 31/007; G01R 31/3682
See application file for complete search history.

(56) References Cited

U.S. PATENT DOCUMENTS

| | | | |
|---|---|---|---|
| 7,363,129 B1 * | 4/2008 | Barnicle | G08C 17/02 701/1 |
| 2004/0088087 A1 * | 5/2004 | Fukushima | B60R 16/0232 701/29.6 |
| 2006/0149437 A1 * | 7/2006 | Somos | 701/29 |
| 2007/0100513 A1 * | 5/2007 | Asano | 701/2 |
| 2008/0246488 A1 * | 10/2008 | Bosse | G01R 19/16542 324/426 |
| 2010/0091647 A1 * | 4/2010 | Li et al. | 370/225 |
| 2014/0214970 A1 * | 7/2014 | Rasbornig | H04L 12/5855 709/206 |
| 2014/0280636 A1 * | 9/2014 | Fredriksson | H04J 3/0652 709/206 |

(Continued)

FOREIGN PATENT DOCUMENTS

| | | | |
|---|---|---|---|
| CN | 102314363 A | * | 1/2012 |
| DE | 10 2008 007 801 A1 | | 10/2008 |
| DE | 10 2008 061 957 A1 | | 9/2009 |

(Continued)

OTHER PUBLICATIONS

German Examination Report dated Nov. 13, 2014 (Seven (7) pages).

*Primary Examiner* — Thomas G Black
*Assistant Examiner* — Ce Li
(74) *Attorney, Agent, or Firm* — Crowell & Moring LLP

(57) ABSTRACT

A device for switching a mode of a vehicle is provided. The device includes a connector that is configured to interface with an on-board diagnostic system of the vehicle; a switch that is configured to indicate a transport mode or an application mode; a memory; and a processor coupled to the memory. The processor includes determination logic that determines the mode of the vehicle based on a state of the switch; and activation logic that activates the mode of the vehicle by sending a first message to the vehicle according to a first protocol, and sending a second message to the vehicle according to a second protocol.

17 Claims, 4 Drawing Sheets

(56) References Cited

U.S. PATENT DOCUMENTS

2014/0328357 A1* 11/2014 Fredriksson .......... H04J 3/0614
                                                    370/520
2015/0232047 A1*  8/2015 Tornare .................. B60R 16/03
                                                    701/1

FOREIGN PATENT DOCUMENTS

| DE | 102008061957 A1 * | 9/2009 | ......... B60G 17/0195 |
| DE | 10 2010 028 452 A1 | 11/2011 | |
| DE | 102010028452 A1 * | 11/2011 | ........... G05D 1/0212 |
| KR | 20100136223 A * | 12/2010 | |

* cited by examiner

DEVICE FOR SWITCHING A MODE OF A VEHICLE

BACKGROUND OF THE INVENTION

The present invention relates to a device for switching a mode of a vehicle, and to methods for using the device to switch the mode of the vehicle. Most new vehicles are shipped to the dealer in a transport mode, in which many of the electronic components are turned off in order to prevent the battery of the vehicle from going into a deep discharge state. The vehicle may then remain on the dealer's lot for several weeks or several months. It is advantageous to keep the vehicle in the transport mode until the sale of the vehicle is final, in order to prevent damage to the battery caused by the deep discharge state. Otherwise the vehicle may be delivered to a customer with a damaged battery.

However, in order to perform a pre-delivery inspection and to deliver the vehicle to a customer, the vehicle must be switched to an application mode, in which the electronic components are able to draw power from the battery of the vehicle according to a normal operational state. The pre-delivery inspection is often performed shortly after delivery of the vehicle to the dealer, in order to ensure that the vehicle is available to be presented and sold immediately to a customer. Only a trained mechanic who is familiar with the workshop diagnostic system is able to activate the application mode of the vehicle. However, generally the workshop is closed and mechanics are unavailable on weekends and evenings, when many spot deliveries occur. Accordingly, it is difficult to keep the vehicle in the transport mode while on the dealer's lot, while still ensuring that the vehicle is available for spot delivery to a customer.

SUMMARY OF THE INVENTION

Exemplary embodiments of the invention provide devices and methods for switching a mode of a vehicle. According to an aspect of the invention, a method of activating an application mode of a vehicle is provided. The method includes connecting a mode switching device to an on-board diagnostic (OBD) system of the vehicle. The mode switching device then activates the application mode on a first electronic control unit (ECU) of the vehicle by sending a first message to the vehicle according to a first protocol, and activates the application mode on a second ECU of the vehicle by sending a second message to the vehicle according to a second protocol.

The mode switching device may send a third message to the vehicle according to the first protocol; receive confirmation messages from the vehicle in response to the third message according to the first protocol; and determine whether each of the confirmation messages includes an application mode indicator. If each of the confirmation messages includes the application mode indicator, the mode switching device deletes a fault memory of the first ECU by sending a fourth message to the vehicle according to the first protocol; deletes a fault memory of the second ECU by sending a fifth message to the vehicle according to the first protocol; and emits a first signal indicating that the application mode has been activated. The first signal may be a visual signal and/or an audible signal.

If at least one of the confirmation messages does not include the application mode indicator, the mode switching device may resend the first message to the vehicle according to the first protocol. The mode switching device again sends the third message to the vehicle according to the first protocol; receives additional confirmation messages from the vehicle in response to the third message according to the first protocol; and determines whether each of the additional confirmation messages includes the application mode indicator.

If each of the additional confirmation messages includes the application mode indicator, the mode switching device deletes a fault memory of the first ECU by sending a fourth message to the vehicle according to the first protocol; deletes a fault memory of the second ECU by sending a fifth message to the vehicle according to the first protocol; and emits a second signal indicating that the application mode has been activated. The second signal may be a visual signal and/or an audible signal. However, if at least one of the additional confirmation messages does not include the application mode indicator, the mode switching device emits a signal indicating that the application mode has not been activated until the mode switching device is disconnected from the vehicle.

The first protocol may be a Uniform Diagnostic Services (UDS) protocol, and the second protocol may be a Keyword Protocol 2000 (KWP) protocol. The mode switching device may wait a predetermined time between activating the application mode on the first ECU and activating the application mode on the second ECU.

According to another aspect of the invention, a method of activating a transport mode of a vehicle is provided. The method includes connecting a mode switching device to an OBD system of the vehicle. The mode switching device activates the transport mode on a first ECU of the vehicle by sending a first message to the vehicle according to a first protocol, and activates the transport mode on a second ECU of the vehicle by sending a second message to the vehicle according to a second protocol.

The first protocol may be a UDS protocol, and the second protocol may be a KWP protocol. The mode switching device may wait a predetermined time between activating the transport mode on the first ECU and activating the transport mode on the second ECU.

According to yet another aspect of the invention, a device for switching a mode of a vehicle is provided. The device includes a connector that is configured to interface with an OBD system of the vehicle; a switch that is configured to indicate a transport mode or an application mode; a memory; and a processor coupled to the memory. The processor includes determination logic that determines the mode of the vehicle based on a state of the switch; and activation logic that activates the mode of the vehicle by sending a first message to the vehicle according to a first protocol, and sending a second message to the vehicle according to a second protocol.

If the switch indicates the application mode, the activation logic sends a third message to the vehicle according to the first protocol; receives confirmation messages from the vehicle in response to the third message according to the first protocol; and determines whether each of the confirmation messages includes an application mode indicator. The processor also includes memory clearing logic that, if each of the confirmation messages includes the application mode indicator, deletes a fault memory of a first ECU by sending a fourth message to the vehicle according to the first protocol, and deletes a fault memory of a second ECU by sending a fifth message to the vehicle according to the first protocol.

The device may include a speaker that emits a first signal if the mode has been activated, and a second signal if the mode has not been activated. Further, the device may include a power source that transforms a first voltage from the vehicle to a second voltage required by the device. The first protocol may be a UDS protocol, and the second protocol may be a KWP protocol.

Other objects, advantages, and novel features of the present invention will become apparent from the following detailed description of the invention when considered in conjunction with the accompanying drawings.

DETAILED DESCRIPTION OF EXEMPLARY EMBODIMENTS

Figure 1:
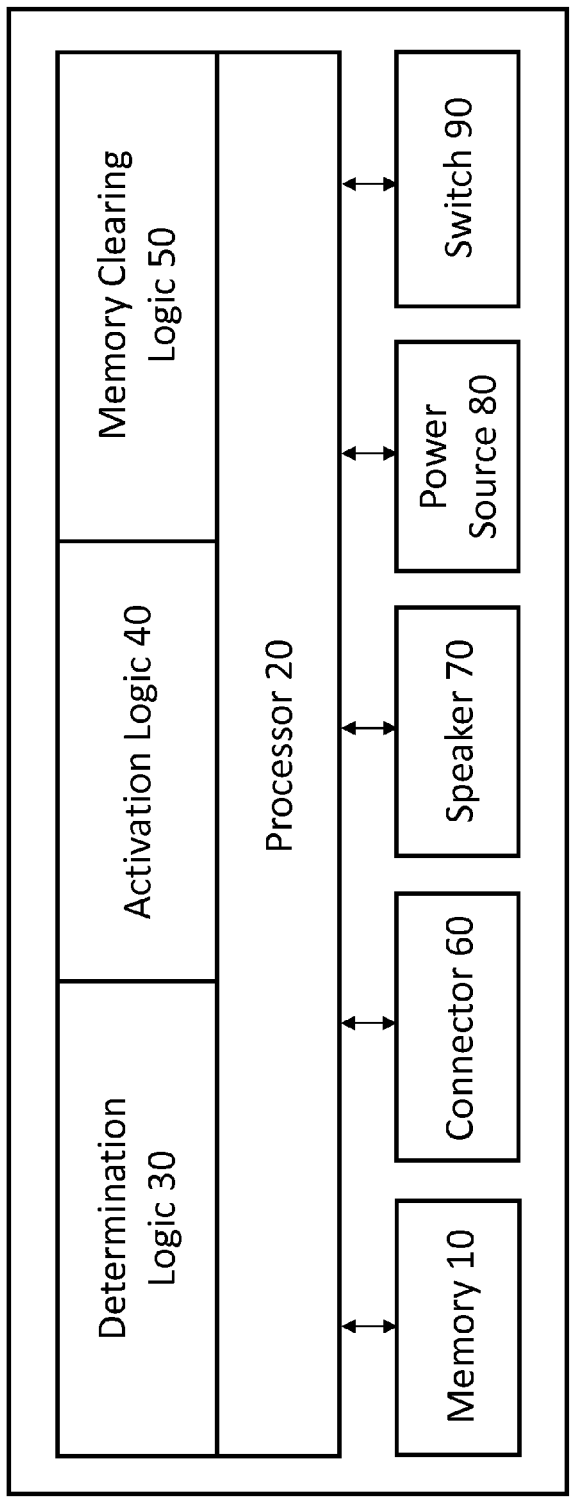
FIG. 1 shows a block diagram of an exemplary embodiment of a device for switching a mode of a vehicle.

FIG. 1 shows a block diagram of an exemplary embodiment of a device for switching a mode of a vehicle. As shown in FIG. 1, the device includes a memory 10 and a processor 20 coupled to the memory 10. The processor 20 includes logic 30-50, which will be described in more detail below in connection with FIGS. 3 and 4. The processor 20 can be any type of processor, such as a microprocessor, a field programmable gate array (FPGA), and/or an application specific integrated circuit (ASIC). When the processor 20 is a microprocessor, logic 30-50 can be processor-executable code that is loaded from the memory 10.

The device also includes a connector 60 that interfaces with an OBD system of the vehicle. The OBD system is the vehicle's self-diagnostic and reporting system. The connector 60 may be designed to interface with any suitable OBD system, such as OBD1 or OBD2. In addition, the device may include a speaker 70 for indicating whether the mode has been successfully switched. Alternatively, the device may include any other component for indicating the result of the mode switching attempt, such as a light emitting diode (LED) that emits visible light or an actuator that provides haptic feedback to a user. Further, the device includes a power source 80 that transforms a voltage from the vehicle to a voltage required by the device. For example, the power source 80 may transform the 12V voltage from the vehicle to the voltage required by a CAN MCP2515 chip that includes the processor 20. The device may also include a switch 90 that allows the user to indicate the desired mode of the vehicle. The switch 90 may be a physical toggle switch, a button, or any other component that alternates between two states.

Figure 2B:
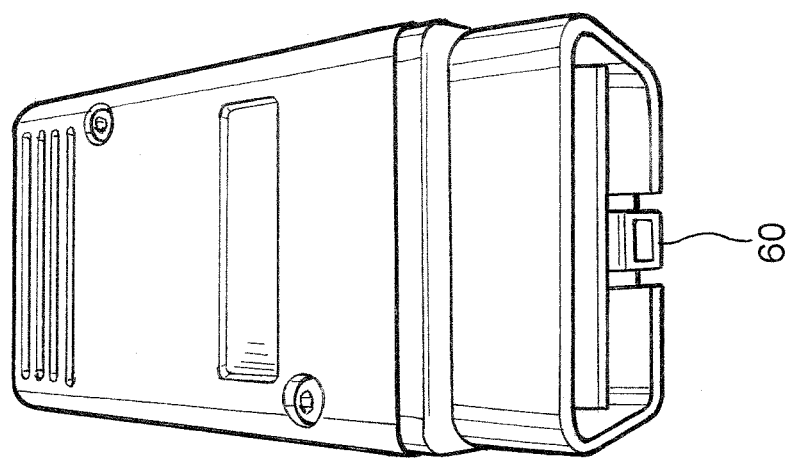
FIGS. 2A and 2B show perspective views of a physical example of the device.
Figure 2A:
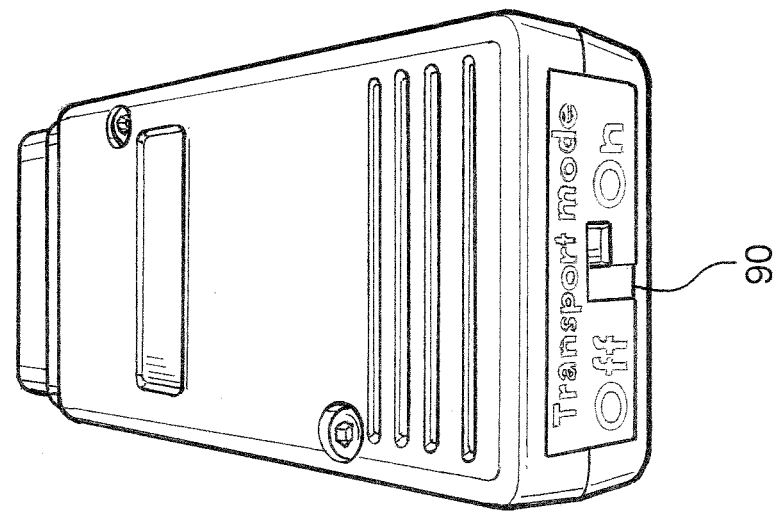

FIGS. 2A and 2B show perspective views of a physical example of the device. FIG. 2A shows a first end of the device having the switch 90, and FIG. 2B shows a second end of the device having the connector 60. Although the connector 60 shown in FIG. 2B is designed to interface with an OBD2 system, the connector 60 may alternatively be designed to interface with any appropriate OBD system. Advantageously the device may be a hand-held device that fits in a user's pocket. For example, the device may have physical dimensions of approximately 9 cm in length, 4 cm in width, and 2 cm in height.

The device automatically switches the mode of the vehicle upon connection of the device to the OBD system of the vehicle. In order to determine which mode to activate, the determination logic 30 of the processor 20 first determines the state of the switch 90. For example, the switch 90 may be set to the transport mode or the application mode. As discussed above, in the transportation mode, many of the electronic components are turned off in order to prevent the battery of the vehicle from going into a deep discharge state. On the other hand, in the application mode, the electronic components are able to draw power from the battery of the vehicle according to a normal operational state. The application mode may be considered to be the deactivation of the transport mode.

Figure 3:
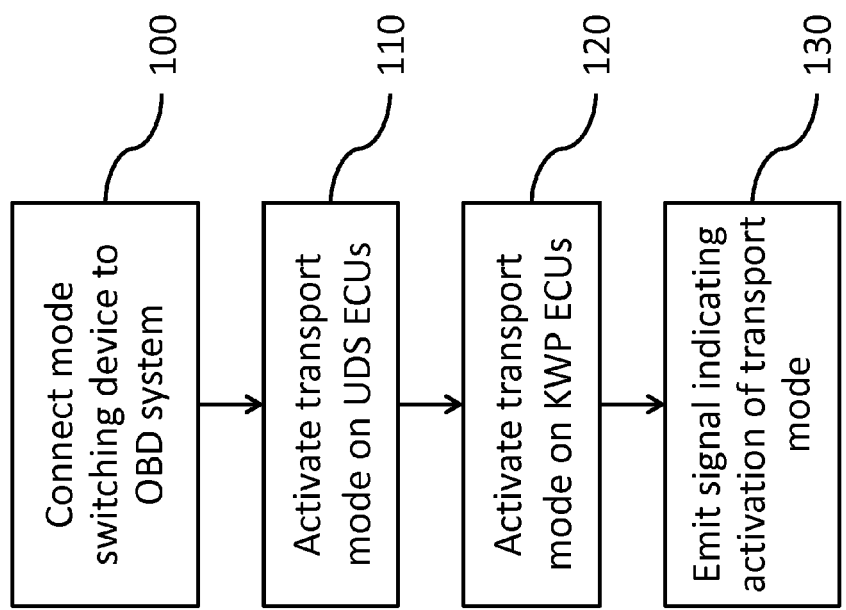
FIG. 3 shows a flowchart of an exemplary embodiment of a method for activating a transport mode of a vehicle.

FIG. 3 shows a flowchart of an exemplary embodiment of a method for activating a transport mode of a vehicle. As shown in FIG. 3, the method begins when the user connects the device to the OBD system of the vehicle at step 100. The activation logic 40 then activates the transport mode on the UDS ECUs of the vehicle by sending a message with a transport mode activation code to the vehicle according to the UDS protocol at step 110. Next the activation logic 40 activates the transport mode on the KWP ECUs of the vehicle by sending a message with a transport mode activation code to the vehicle according to the KWP protocol at step 120. The device then emits a signal to indicate that the transport mode has been activated at step 130. For example, the speaker 70 may beep twice. This notifies the user that the device may be disconnected from the OBD system of the vehicle. The device may wait a predetermined amount of time, such as 0.5 seconds, between steps 110 and 120 and/or between steps 120 and 130.

Figure 4:
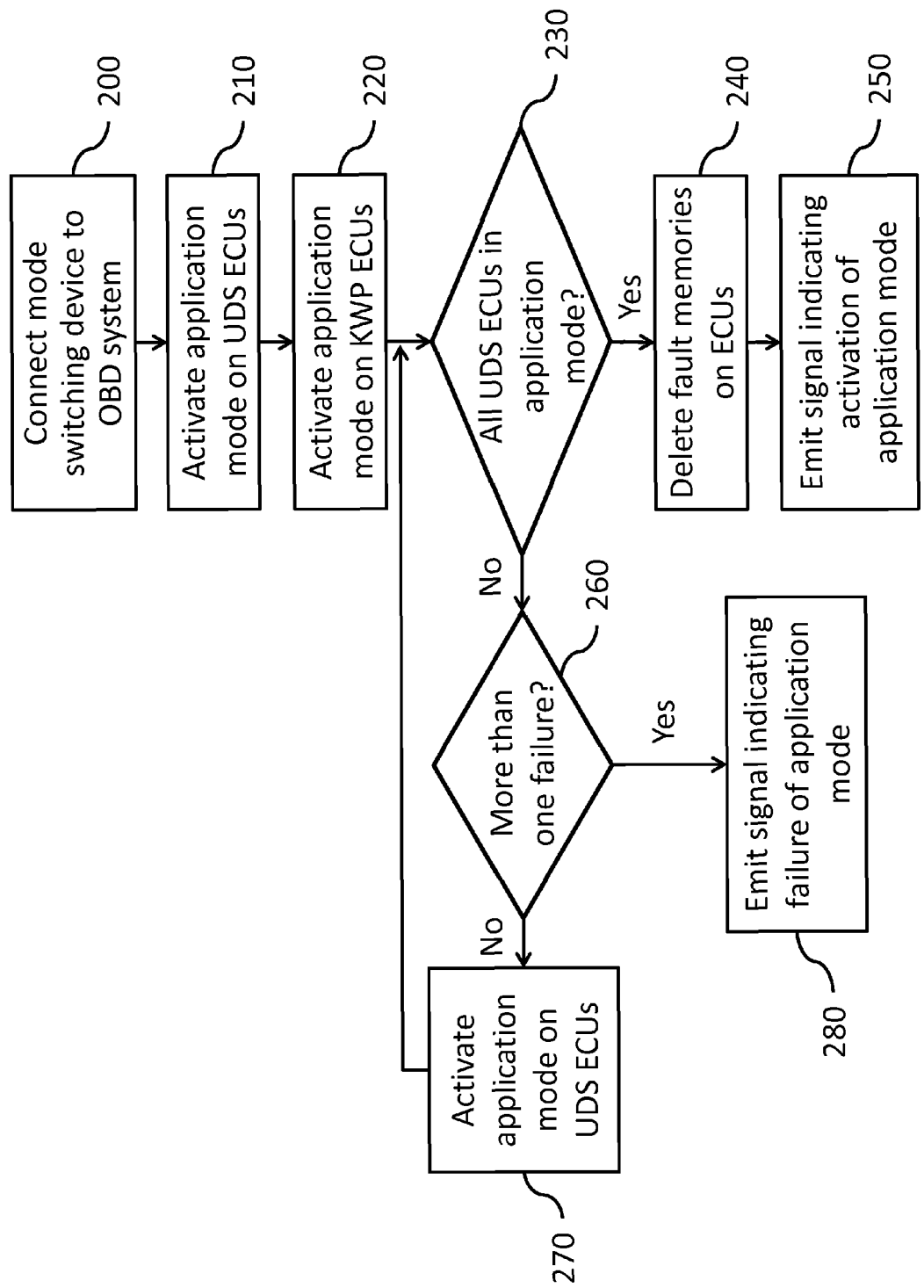
FIG. 4 shows a flowchart of an exemplary embodiment of a method for activating an application mode of a vehicle.

FIG. 4 shows a flowchart of an exemplary embodiment of a method for activating an application mode of a vehicle. As shown in FIG. 4, the method begins when the user connects the device to the OBD system of the vehicle at step 200. The activation logic 40 then activates the application mode on the UDS ECUs of the vehicle by sending a message with an application mode activation code to the vehicle according to the UDS protocol at step 210. Next the activation logic 40 activates the application mode on the KWP ECUs of the vehicle by sending a message with an application mode activation code to the vehicle according to the KWP protocol at step 220.

The activation logic 40 may then check whether all of the UDS ECUs were successfully switched to the application mode at step 230. For example, the activation logic 40 may send a message with a code inquiring about the current mode of the UDS ECUs, and analyze responses received within a predetermined time period, such as 2 seconds. In order to be considered, the responses must have a specific structure. For example, the responses must have a diagnostic address.

If all of the analyzed responses indicate that the corresponding UDS ECUs are in the application mode, such as by including 0x00 on the $3^{rd}$ last byte, the activation logic 40 confirms that all of the UDS ECUs were successfully switched to the application mode. In this case the memory clearing logic 50 deletes the fault memories on the UDS ECUs and/or the KWP ECUs at step 240. For example, the memory clearing logic 50 may send a message with a memory clearing code to the vehicle according to the UDS protocol, wait for a predetermined time, such as 0.5 seconds, and then may, in some examples, send a message with a memory clearing code to the vehicle according to the KWP protocol. Deleting the fault memories of the ECUs removes erroneous faults caused by the mode switch. Next the activation logic 40 may wait a predetermined time, such as 0.5 seconds, and emit a signal indicating that the application mode has been activated at step 250. For example, the speaker 70 may beep three times. This notifies the user that the device may be disconnected from the OBD system of the vehicle. This signal may be different from the signal used to notify the user that the transport mode has been activated. The device may wait a predetermined amount of time, such as 0.5 seconds, between steps 210 and 220 and/or between steps 220 and 230.

If the activation logic 40 determines that not all of the UDS ECUs were successfully switched to the application mode, the activation logic 40 determines whether there has been more than one failure to switch at step 260. If there has been more than one failure to switch, the activation logic terminates the process and emits a signal indicating the failure at step 280. For example, the speaker 70 may emit a continuous beep until the device is disconnected from the OBD system of the vehicle. This signal is different from the signals indicating a successful activation of the transport mode or the application mode.

If there has only been one failed attempt to switch the UDS ECUs to the application mode, the activation logic 40 makes another attempt to achieve the switch at step 270. The activation logic 40 again sends a message with an application mode activation code to the vehicle according to the UDS protocol. The method then continues by again checking whether all of the UDS ECUs were successfully switched to the application mode at step 230.

The device described above is easy and intuitive for a non-technical person, such as a salesperson, to use. Conveniently, the device may be hand-held and fit within the salesperson's pocket. The device may be used to activate the application mode of the vehicle upon delivery to the dealer. After performing the pre-delivery inspection in the application mode, the device may be used to return the vehicle to the transport mode until the sale is finalized. Once the vehicle has been sold, the device may be used to switch the vehicle to the application mode for immediate delivery to a customer. Accordingly, it is possible to keep the vehicle in the transport mode while waiting on the dealer's lot, and still ensure that the vehicle is available for spot delivery to a customer. Further, remote entry is deactivated in the transport mode, reducing the risk of unlawful remote entry while the vehicle is stored on the dealer's lot.

According to another exemplary embodiment of the invention, there is provided a non-transitory computer-readable medium encoded with a computer program for switching a mode of a vehicle. The term "computer-readable medium" as used herein refers to any medium that participates in providing instructions for execution. Common forms of computer-readable media include, for example, a floppy disk, a flexible disk, a hard disk, magnetic tape, any other magnetic medium, a CD-ROM, any other optical medium, punch cards, paper tape, any other physical medium with patterns of holes, a RAM, a PROM, an EPROM, a FLASH-EPROM, any other memory chip or cartridge, and any other non-transitory medium from which a computer can read.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of activating an application mode of a vehicle, the method comprising:

connecting a mode switching device to an on-board diagnostic system of the vehicle;

activating, by the mode switching device, the application mode on a plurality of first electronic control units (ECUs) of the vehicle by sending a first message with a first application mode activation code to the vehicle according to a first protocol, wherein the first application mode activation code is sent automatically by the mode switching device;

activating, by the mode switching device, the application mode on a plurality of second ECUs of the vehicle different from the first ECUs by sending a second message with a second application mode activation code to the vehicle according to a second protocol, wherein the second application mode activation code is sent automatically by the mode switching device, and determining, by the mode switching device, whether all of the plurality of first ECUs are in the application mode, and when the mode switching device determines that all of the plurality of first ECUs are in the application mode, deleting, by the mode switching device, fault memories of the first ECUs, wherein the fault memories of the first ECUs are erroneous faults caused by mode switch.

2. The method according to claim 1, wherein the determining whether all of the plurality of first ECUs are in the application mode further comprises:

sending, by the mode switching device, a third message to the vehicle according to the first protocol;

receiving, by the mode switching device, confirmation messages from the vehicle in response to the third message according to the first protocol; and determining, by the mode switching device, whether each of the confirmation messages includes an application mode indicator.

3. The method according to claim 2, further comprising, if each of the confirmation messages includes the application mode indicator:

deleting, by the mode switching device, the fault memories of the first ECUs by sending a fourth message to the vehicle according to the first protocol;

deleting, by the mode switching device, fault memories of the second ECUs by sending a fifth message to the vehicle according to the first protocol; and emitting, by the mode switching device, a first signal indicating that the application mode has been activated.

4. The method according to claim 3, wherein the first signal is at least one of a visual signal or an audible signal.

5. The method according to claim 2, further comprising, if only one of the confirmation messages does not include the application mode indicator:

resending, by the mode switching device, the first message to the vehicle according to the first protocol.

6. The method according to claim 5, further comprising:

resending, by the mode switching device, the third message to the vehicle according to the first protocol;

receiving, by the mode switching device, additional confirmation messages from the vehicle in response to the third message according to the first protocol; and determining, by the mode switching device, whether each of the additional confirmation messages includes the application mode indicator.

7. The method according to claim 6, further comprising, if each of the additional confirmation messages includes the application mode indicator:

deleting, by the mode switching device, the fault memories of the first ECUs by sending a fourth message to the vehicle according to the first protocol;

deleting, by the mode switching device, fault memories of the second ECUs by sending a fifth message to the vehicle according to the first protocol; and emitting, by the mode switching device, a second signal indicating that the application mode has been activated.

8. The method according to claim 7, wherein the second signal is at least one of a visual signal or an audible signal.

9. The method according to claim 6, further comprising, if more than one of the additional confirmation messages does not include the application mode indicator:

emitting, by the mode switching device, a signal indicating that the application mode has not been activated until the mode switching device is disconnected from the vehicle.

10. The method according to claim 1, wherein the first protocol is a Uniform Diagnostic Services protocol, and the second protocol is a Keyword Protocol 2000 protocol.

11. The method according to claim 1, further comprising waiting a predetermined time between activating the application mode on the first ECUs and activating the application mode on the second ECUs.

12. A device for switching a mode of a vehicle, the device comprising:

a connector that is configured to interface with an on-board diagnostic system of the vehicle;

a switch that is configured to indicate a transport mode or an application mode;

a memory; and a processor coupled to the memory, the processor comprising:

determination logic that determines the mode of the vehicle based on a state of the switch;

activation logic that activates the mode of the vehicle by:

sending a first message with a first transport mode activation code or a first application mode activation code to the vehicle according to a first protocol and activating the mode on a plurality of first electronic control units (ECUs), wherein the first transport mode activation code or the first application mode activation code is sent automatically by the activation logic, sending a second message with a second transport mode activation code or a second application mode activation code to the vehicle according to a second protocol and activing the mode on a plurality of second ECUs, wherein the second transport mode activation code or the second application mode activation code is sent automatically by the activation logic, and wherein the activation logic determines whether all of the plurality of first ECUs are in the application mode; and a memory clearing logic, when the mode switching device determines that all of the plurality of first ECUs are in the application mode, deletes:

fault memories of the first ECUs, wherein the fault memories of the first ECUs are erroneous faults caused by the switching of the mode.

13. The device according to claim 12, wherein if the switch indicates the application mode, the activation logic:

sends a third message to the vehicle according to the first protocol;

receives confirmation messages from the vehicle in response to the third message according to the first protocol; and determines whether each of the confirmation messages includes an application mode indicator.

14. The device according to claim 13, wherein the memory clearing logic, if each of the confirmation messages includes the application mode indicator, deletes the fault memories of the first ECUs by sending a fourth message to the vehicle according to the first protocol, and deletes fault memories of the second ECUs by sending a fifth message to the vehicle according to the first protocol.

15. The device according to claim 12, further comprising a speaker that emits a first signal if the mode has been activated, and a second signal if the mode has not been activated.

16. The device according to claim 12, further comprising a power source that transforms a first voltage from the vehicle to a second voltage required by the device.

17. The device according to claim 12, wherein the first protocol is a Uniform Diagnostic Services protocol, and the second protocol is a Keyword Protocol 2000 protocol.

* * * * *